United States Patent [19]

Joyce

[11] Patent Number: 5,054,643
[45] Date of Patent: Oct. 8, 1991

[54] CASSETTE HOUSING

[75] Inventor: Michael Joyce, Kinnelon, N.J.

[73] Assignee: Joyce Molding Corp., Rockaway, N.J.

[21] Appl. No.: 553,229

[22] Filed: Jul. 16, 1990

[51] Int. Cl.[5] .................. B65D 43/24; B65D 43/14; B65D 85/672
[52] U.S. Cl. .................................. 220/335; 220/337; 206/387
[58] Field of Search ............... 220/305, 339, 337, 336, 220/335; 206/387

[56] References Cited

U.S. PATENT DOCUMENTS

| | | | |
|---|---|---|---|
| 3,628,215 | 12/1971 | Everburg | 220/337 X |
| 4,403,712 | 9/1983 | Wiesinger | 220/335 X |
| 4,726,091 | 2/1988 | Joyce | 220/335 |
| 4,982,866 | 1/1991 | Krawagna | 220/335 |

Primary Examiner—William I. Price
Attorney, Agent, or Firm—John D. Kaufmann

[57] ABSTRACT

A housing for an audio or a video tape cassette is disclosed, including a housing body formed by a bottom rectangular panel which is slightly larger than the cassette. The bottom rectangular panel is connected to four depending side wall extending forward and perpendicular to the periphery of the bottom panel to form an enclosure with an access opening at the top of the housing body. A swingable tab is provided in at least one of the side walls proximate to the access opening. The swingable tab provides opening and closing of the enclosure and of the access opening to removably receive and hold the cassette therein. The swingable tab is connected to the side wall by a film hinge having an essentially curved or arcuate connecting portion with a reduced thickness which is substantially less than the thickness of the side wall and of the swingable tab. The swingable tab has a parabolic surface configuration. When the swingable tab is opened the swingable tab has an outward bowed convex configuration, with the convex surface extending outward from the side wall to permit an unobstructed access opening into the enclosure for removal or insertion of the cassette therein. When the swingable tab is pressed inwardly by the user the swingable tab is biased by the deformation energy being transferred through the integral film hinge to swing the swingable tab to an inward bowed convex configuration with the convex surface bowed within the side wall to hold the cassette within the enclosure.

11 Claims, 3 Drawing Sheets

CASSETTE HOUSING

This invention relates to a case, package, housing or container for an item. In particular embodiments, the invention relates to a case or container for a tape cassette audio or video.

It is an object of the invention to provide a cassette case which is expeditiously made by mass production of a sturdy, inexpensive, material, and which is convenient to use.

SUMMARY OF THE INVENTION

In my prior patent, U.S. Pat. No. 4,726,091, there is disclosed and claimed a snap-action hinge. The hinge, which is preferably molded from a resilient plastic such as polypropylene, has two members interconnected by a narrow, integral web which is thinner than the members. The web and the facing edges of the members interconnected thereby are arcuate. The members are relatively, manually swingable about and on the web between two stable positions, one of which may constitute the hinge in its as molded configuration. Typically, when the members are in their stable relative positions, one of them is normally bowed into an arcuate or parabolic shape.

As the members are relatively, manually swung out of one stable position and toward the other stable position, the normally bowed member is distorted into double-S or other non-parabolic shape. This distortion gives rise to stress forces on the web and the distorted member tending to return the members to the one stable position or to complete relative swinging to the other stable position with a snap-action depending on the magnitude and duration of the manual force. In the other stable position, the normally arcuate member is again parabolic, but oppositely so.

To achieve the foregoing object, and in accordance with the purposes of specific embodiments of the invention as described herein, a case for a tape cassette is provided.

It should be understood that cases according to the present invention are usable with items such as audio or video cassettes, as well as with other manualy handled items or moderate size which are to be encased or housed for storage, sale, handling or the like.

The case includes a housing having a bottom wall and four side walls, defining a volume which is generaly conformed to an item to be encased. The case has an access opening opposite the bottom wall. The access opening and the walls are configured to permit insertion and removal of an item, such as a cassette, into and from the defined volume.

At least one of the side walls carries a swingable tab, proximate to the access opening. The swingable tab enables a user to "open" and to "close" the housing and its access opening by selectively preventing or permitting insertion or removal of an item into or from the volume. Specifically, when the tab is swung inwardly to overlie or block a portion of the access opening, an item cannot be inserted into the volume, nor can an encased item be removed. When the tab is swung outwardly out of or to unblock the access opening, the item can, as appropriate be inserted or removed.

The swingable tab is connected to the side wall by a web or film hinge which has a thickness substantially less than that of the swingable tab and the side wall. This film hinge is curved or arcuate in form. When the housing and the access opening are open, the swingable tab has an outwardly bowed, convex position (as viewed from outside the case) with the convex surface extending outwardly from the plane of the side wall to permit unobstructed insertion of an item through the access opening into the housing. After such insertion, the housing is closed by swinging the tab to an inwardly bowed, convex position with the convex surface extending inwardly from the inner surface of the side wall and overlying or blocking a portion of the access opening to retain an item within the case. The first and second bowed configurations of the swingable tab position the tab on opposite sides of the plane of the side wall. As in my '091 patent, the oppositely directed stresses created by deforming the tab during swinging thereof urge the tab into one of the bowed configurations corresponding to opening and closing, respectively, of the access opening and the housing.

DETAILED DESCRIPTION

Figure 1:
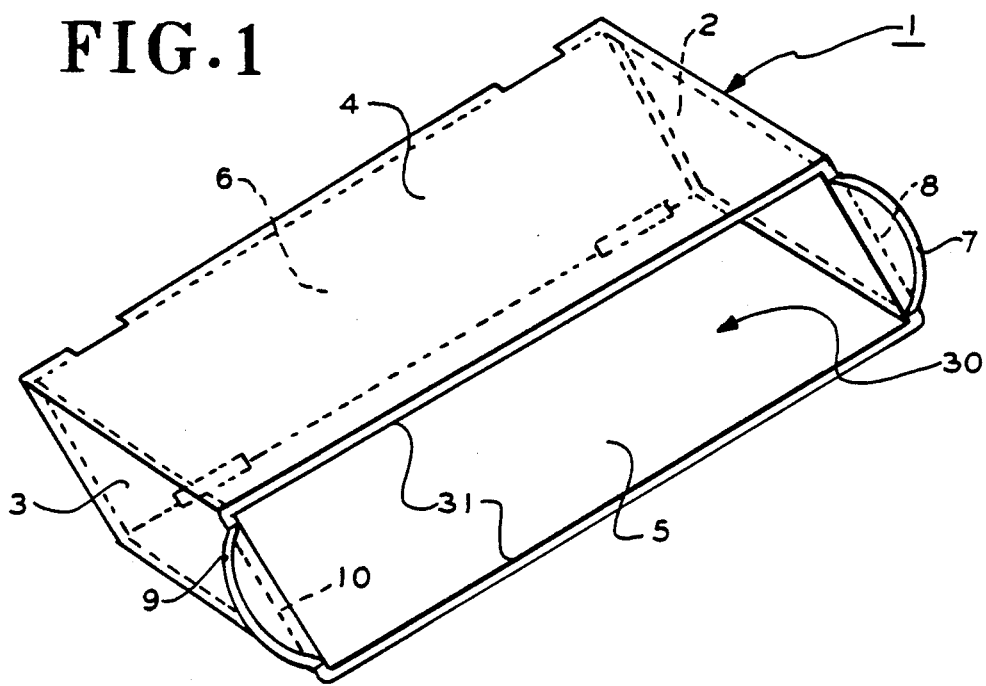
FIG. 1 is a perspective, top view of the case housing in an opened condition, according to the invention.

With particular reference to the above drawings, in which like reference numerals refer to like portions, a case according to the invention is now described as housing the specific form of a video cassette case or holder 1.

Figure 4:
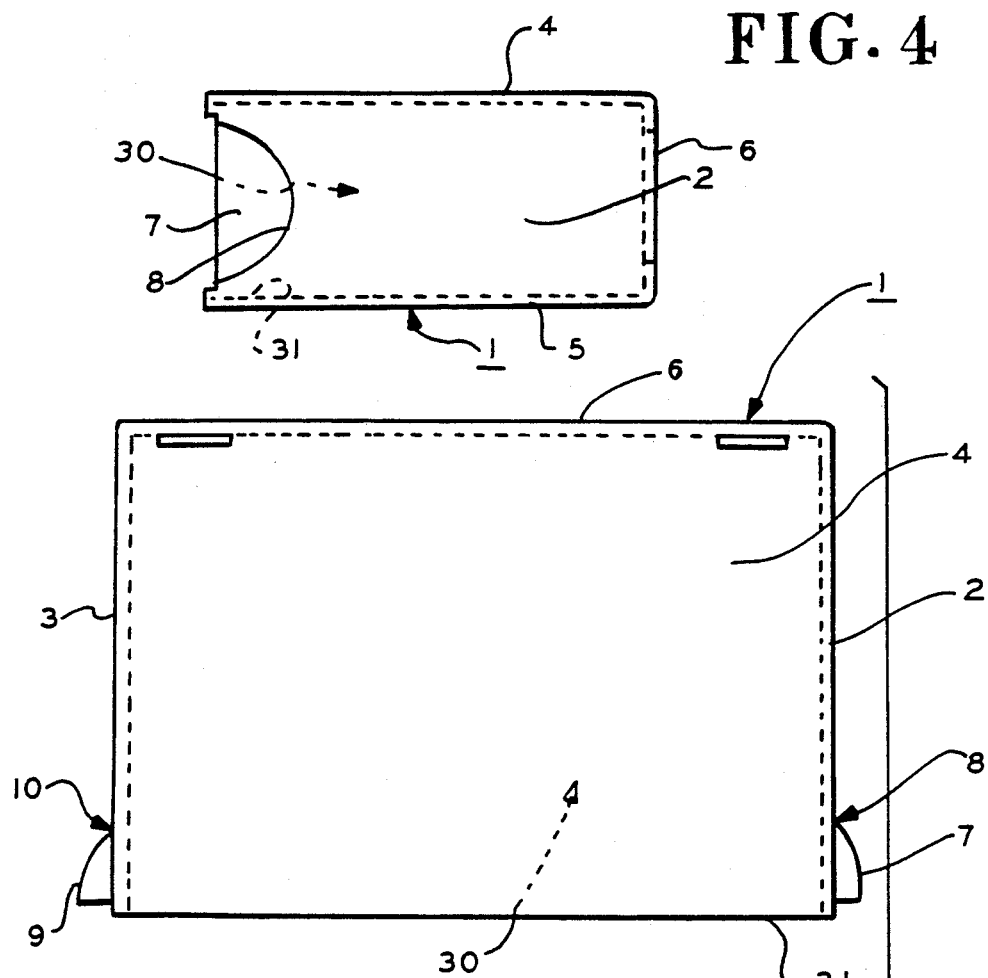
FIG. 4 is a side view of the opened cassette housing along line 4—4 of FIG. 2.
Figure 5:
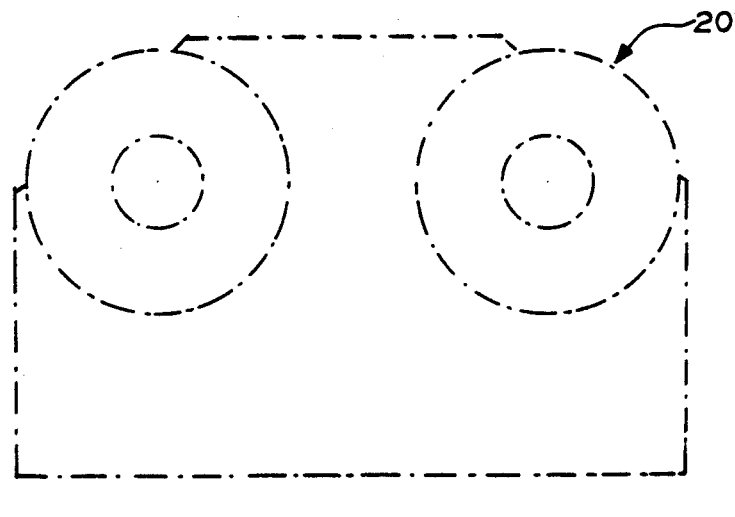
FIG. 5 is a front view of the open case used as a holder for a video tape cassette.

In FIGS. 1–5, the case 1 is shown having a flat bottom wall 6. The bottom wall 6 is connected to four side walls 2, 3, 4 and 5, which are connected to each other, to define a volume 30 which is generally conformed to a tape cassette 20 (FIG. 5). Access to the volume 30 is gained by an access opening 31 opposite the bottom wall 6. Each of the side walls 2, 3, 4 and 5 is generally perpendicular to its adjacent side walls. As should be apparent, differing wall configurations and orientations to conformally encase other items are within the skill of the art.

The volume 30 and the access opening 31 of the cassette case 1 are configured so as to removably receive and to conformally contain the tape cassette 20, as shown by the arrows X in FIG. 5. On opposing side walls such as the walls 2 and 3 there are provided swingable tabs 7 and 9 respectively. The swingable tabs 7, 9 are located at a free edge of the side walls 2 and 3, respectively, adjacent to the access opening 31. The swingable tabs 7 and 9 are connected to the side walls 2 and 3 by webs or film hinges 8 and 10, respectively, which, as shown, are identical to each other. As shown in FIG. 4, the film hinges 8 and 10 have curved or arcuate configurations.

It will be appreciated that a single tab, such as the tab 7, may be provided on only one wall, such as the wall 2. Further, a one-tab or two-tab arrangement may involve tabs on one or both of the walls 4 and 5. The essential requirement as to the placement and number of tabs is that insertion and removal of an item into the case 1 is selectively permitted or prevented depending on the position of the tab or tabs, as hereinafter set forth.

Figure 2:
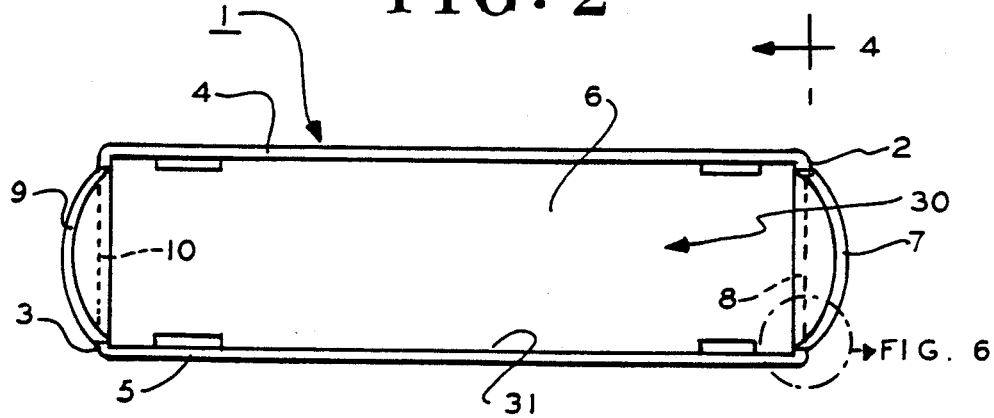
FIG. 2 is a top view of the open case housing.
Figure 3:
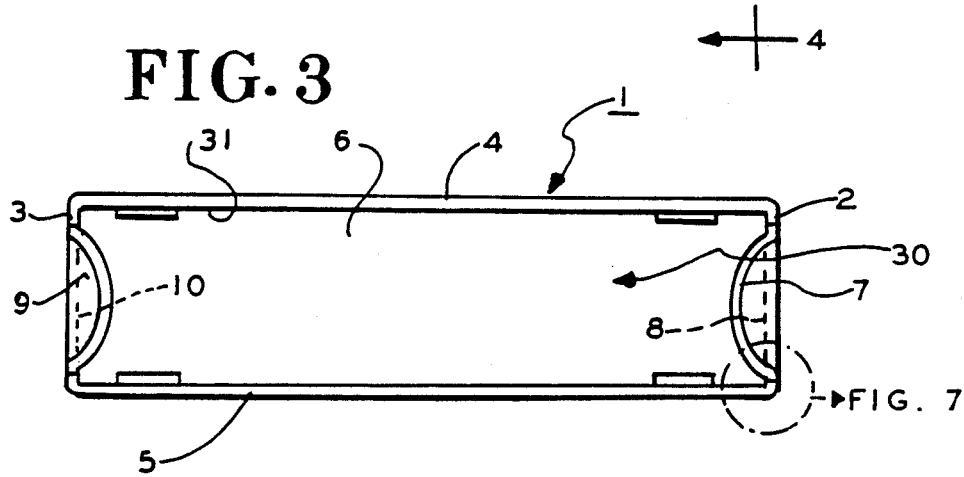
FIG. 3 is a front view of the closed case housing.
Figure 6:
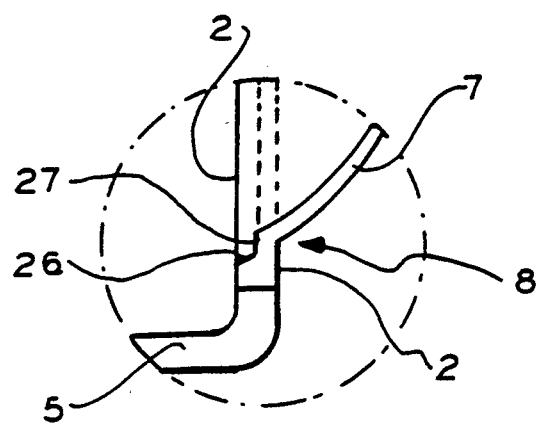
FIG. 6 is an enlarged view of the portion of the open case of FIG. 2 taken at the area thereof labelled FIG. 6.
Figure 7:
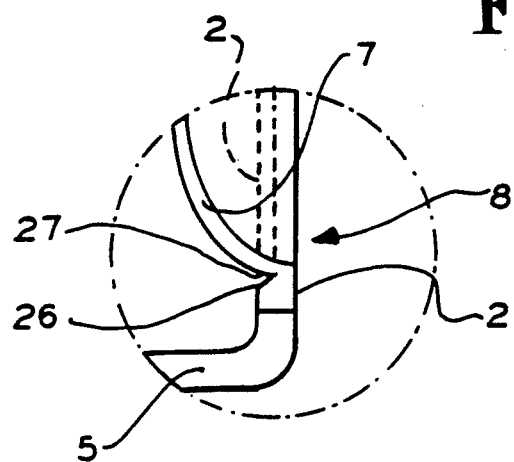
FIG. 7 is an enlarged view of a portion of the closed case of FIG. 3 taken at the area thereof labelled FIG. 7.

Referring now to FIGS. 6 and 7 there is shown an enlargement of the film hinge 8. The hinge 10 is similar. When the tab 7 is bowed outwardly (FIGS. 1, 2 and 6) the outer surface thereof has a convex shape and the inner surface thereof has a concave shape, as shown in FIG. 6; and when tab 7 is bowed inwardly (FIGS. 3 and 7) whereby the inner surface thereof has a convex shape. The film hinge 8 connects the swingable tab 7 to the side wall 2. The side wall 2 has a thickness of about 0.06 inch. The swingable tab 7 has a thickness of about 0.04 inch. The film hinge 8 has a reduced thickness connected through a bevel 26 to the side wall 2, and through a bevel 27 to the swingable tab 7. The film hinge 8 is curved or arcuate as viewed in FIG. 4. The swingable tab 7 has an essentially parabolic surface configuration when in either the closed position (FIG. 3) or the open position (FIG. 2). The swingable tab 7 is capable of changing its shape or deforming so that, due to the shape of the film hinge 8, deformation energy applied to the swingable tab 7 is transferred via the film hinge 8 to bias the swingable tab 7 from the opened position of FIG. 6 to the closed position of FIG. 7, or vice versa. Such opening or closing of the swingable tab 7 is accomplished by pressing a finger on the swingable tab 7 so as to deform it, which causes the deformation energy to be transferred via the film hinge 8 to bias the swingable tab 7 from the closed to the opened position, or vice versa.

It will be noted that the internal stresses set up in the tab 7 and the film hinge 8 function in a manner of a bi-stable spring which biases the swingable tab 7 in the direction of one of two stable positions, either opened or closed, on either side of the plane of the side wall 2. When the user deforms the swingable tab 7, the deformation energy is transmitted through the film hinge 8 to bias the swingable tab from either the opened or closed position to the opposite position.

When the case 1 is open as shown in FIGS. 1, 2, 5 and 6, the cassette 20 may be inserted through the unblocked access opening 31 into the volume 30. When the outwardly bowed swingable tab 7 is moved inwardly, the swingable tab 7 is distorted and snaps into the access opening 31 blocking a portion thereof and preventing removal of the cassette 20. In the closed position, the tab 7 holds the cassette 20 within the housing 30 until the swingable tab 7 is thereafter re-opened.

The film hinge 8 of the invention can be made from any resilient thermoplastic material such as polypropylene or it can also be urethane or flexible thermosetting elastomers such as rubber.

Where the encased item is video cassette 20, the volume 30 may be made large enough to accomodate a cardboard or paper sleeve bearing graphics describing the contents of the videotape and other data. To that end, the case 1 may be clear or translucent, to permit reading of the graphics therethrough, and may include (if necessary) facilities to retain the sleeve when and after the video cassette is removed. Such detention facilities may comprise a simple inward bowing of the longer walls 4 and 5 to frictionally resist removal of the sleeve when the cassette 20 is withdrawn.

It will be understood that the embodiments described herein are merely exemplary and that a person skilled in the art may make many variations and modifications without departing from the spirit and scope of the invention. All such modications and variations are intended to be included within the scope of the invention as defined in the appended claims.

What is claimed is:

1. An improved case for an item, the case having a plurality of walls defining a volume into and out of which the item may be inserted and removed through an opening communicating with the volume; wherein the improvement comprises:
   a swingable, snap-action, bistable member on one of the walls adjacent the opening, the member overlying and blocking a portion of the opening in a first stable position thereof and unblocking the opening in a second stable position thereof, the member comprising
   a tab, and
   a film hinge which is integral with the tab and the wall and is arcuately shaped as viewed generally perpendicularly to the plane of the wall, the tab having an arcuate, generally parabolic shape in its stable positions;
   whereby applied forces tending to move the tab out of its stable positions effect deformation of the tab, which deformation cooperates with the film hinge to apply stress forces to the tab which bias the tab to one of the stable positions thereof as a function of the magnitude and duration of the applied forces.

2. An improved case as in claim 1, wherein:
   the walls of the case are transparent or transluscent.

3. An improved case as in claim 2, wherein:
   the one wall, the tab and the film hinge are integrally molded from polypropylene.

4. An improved case as in claim 3, wherein:
   the film hinge is substantially thinner than the wall and the tab.

5. An improved case as in claim 1, which further comprises:
   means for retaining in the volume, following removal of the item, printed matter inserted thereinto.

6. A holder for a cassette, comprising:
   a housing having an open end, and
   a swingable tab,
   a film hinge connecting the tab to the housing at the open end, the film hinge having an arcuate shape, the tab being movable in snap-action fashion with respect to the housing on and about the film hinge between a first position, in which the tab is bowed outwardly away from the housing, and a second position, in which the tab is bowed inwardly into said housing to restrict the open end of the housing.

7. A housing for a cassette according to claim 6, wherein:
   the swingable tab has a parabolic surface configuration in its first and second positions.

8. A housing for a cassette according to claim 1, wherein:
   the film hinge, tab and housing are made of polypropylene.

9. A housing for a cassette according to claim 1, containing:
   two or more swingable tabs.

10. A housing for an article, comprising:
    a housing body including a bottom wall and side walls forming a volume with an access opening configured to removably receive and hold an article;

a swingable tab in one wall, the swingable tab having a first outward bowed position for providing unrestricted access to the volume through the access opening, and a second inward bowed position for blocking a portion of the access opening and for removably retaining the article within said enclosure, the tab being swingable in snap-action fashion between the two positions upon application thereto of force; and a film hinge connecting the swingable tab to the wall, the film hinge having a curved configuration to provide a bi-stable springing action to the swingable tab in response to deformation of the swingable tab due to applied force thereon to move the swingable tab on said film hinge between the first bowed opened position and the second bowed closed position.

11. An improved walled article holder defining a volume into and out of which an article may be placed and removed through an opening communicating with the volume, wherein the improvement comprises:

a tab at a free edge of one wall of the holder adjacent the opening, the tab being movable between a first position, whereat it blocks the opening, and a second position, whereas it unblocks the opening, film hinge means, integral with the tab and the one wall, for permitting movement of the tab relative to the one wall, the hinge being arcuate as viewed perpendicularly to the plane of the one wall, the tab in the first or second position being parabolic when viewed parallel to the plane of the one wall, the tab being stable only in the first and second positions, movement of the tab between the first and second positions being generally perpendicular to the radius of the arc of the hinge and parallel to the axis of the parabola, whereby the tab is movable with a snap-action to block or unblock the opening.

* * * * *